United States Patent [19]

Braychak et al.

[11] Patent Number: 4,708,553
[45] Date of Patent: Nov. 24, 1987

[54] LARGE SECONDARY HEAD RIVET

[75] Inventors: Joseph J. Braychak, Bethany; John P. Casey, Sr., Prospect, both of Conn.

[73] Assignee: USM Corporation, Farmington, Conn.

[21] Appl. No.: 776,290

[22] Filed: Sep. 16, 1985

Related U.S. Application Data

[63] Continuation-in-part of Ser. No. 537,082, Sep. 29, 1983, abandoned.

[51] Int. Cl.⁴ .............................................. F16B 13/04
[52] U.S. Cl. ........................................ 411/34; 411/61; 411/503
[58] Field of Search .................... 411/34–38, 411/39–43, 57–59, 60, 61, 70, 501–503

[56] References Cited

U.S. PATENT DOCUMENTS

| 1,611,288 | 12/1926 | Sibley | 411/61 |
| 1,615,048 | 1/1927 | Sibley | 411/503 |
| 2,150,080 | 3/1939 | Rawlings | 411/37 |
| 2,324,142 | 7/1943 | Eklund | 411/38 |
| 3,178,989 | 4/1965 | Siebol | 411/38 |
| 3,789,728 | 2/1974 | Shackelford | 411/34 |
| 3,834,270 | 9/1974 | Triplett et al. | 411/38 |

FOREIGN PATENT DOCUMENTS

| 2257002 | 9/1973 | Fed. Rep. of Germany | 411/36 |
| 6900334 | 7/1970 | Netherlands | 411/38 |

Primary Examiner—Gary L. Smith
Assistant Examiner—Neill Wilson
Attorney, Agent, or Firm—Alan N. McCartney

[57] ABSTRACT

A blind rivet having an easily settable secondary head with the rivet body having a plurality of longitudinally extending circumferentially spaced weakened areas terminating in spaced relation from the rivet flange and the open end of the rivet so that upon setting, the rivet body separates at the weakened areas to form a plurality of outwardly extending deformed areas for an enlarged secondary head on the rivet.

3 Claims, 7 Drawing Figures

LARGE SECONDARY HEAD RIVET

This application is a continuation in part of U.S. patent application Ser. No. 537,082 filed Sept. 29, 1983 now abandoned.

BACKGROUND OF THE INVENTION

1. Field of the Invention

This invention relates to blind rivets and particularly blind rivets having a large secondary head.

2. Statement as to Prior Art

There are a number of different types of blind rivets on the market which have a hollow rivet body with a flanged head on one end and open on the opposite end. A mandrel stem is adapted to pass through the opening in the body of the rivet with the mandrel stem having an head positioned adjacent the open end of the rivet body. The rivet body can then be inserted into the opening in a workpiece with the flange of the rivet lying flat against the surface of the workpiece. The nosepiece of a rivet setting tool is placed against the flange of the rivet body and by pulling the mandrel, the rivet body opposite the flange is upset by the head of the mandrel on the opposite side of the workpiece to form a secondary head on the rivet body thus, securing the rivet to the workpiece. This process is generally known in the art as "setting" the rivet. A continued pulling force on the mandrel stem will break off the mandrel stem from the mandrel head permitting removal of the mandrel stem from the rivet. In this manner, the rivet is secured in the opening in the workpiece with the flange of the rivet against one surface of the workpiece and the formed secondary head against the opposite surface of the workpiece.

Examples of rivets of this type and tools for setting the rivets are illustrated in U.S. Pat. Nos. 3,254,522; 3,302,444 and 3,324,700.

SUMMARY OF THE INVENTION

In the aforementioned types of blind rivets, the rivet body is generally slightly smaller than the opening of the workpiece. Further, the length of rivet body is slightly longer than the thickness of the workpiece. Thus, in the "setting" of the rivet, the secondary head is smaller than the flanged end of the rivet. Further, in this type of rivet, as the mandrel head is forced against the rivet body to form the secondary head, resulting lateral forces from the rivet body act against the opening in the workpiece. If the workpiece is a soft material, these lateral forces will enlarge or otherwise deform the opening in the workpiece leaving a poor connection.

It is therefore an object of this invention to provide a blind rivet which has a rivet body configuration which can form the secondary head permitting the rivet to be used in soft material.

It is another object of this invention to provide a rivet with an enlarged secondary head to provide a larger bearing area on the workpiece to reduce the likelihood of failure of the bearing area between the secondary head and a workpiece of soft material or workpieces that have holes slightly larger than the body of the rivet.

It is further object of this invention to provide a blind rivet that is capable of fastening a wide range of thickness of workpieces together.

It is also an object of this invention to provide a blind rivet having a rivet body with longitudinally disposed preformed areas of weakness along the body to form the secondary head. The rivet body is of a length such that a wide range of thickness of workpieces can be secured together. During the setting operation, the rivet body is adapted to separate along the longitudinal areas of weakness to form a plurality of spaced petals that form the secondary head.

It is an additional object of this invention to provide longitudinally extending weakened areas along the body of a rivet forming abutting solid body portions which separate when the rivet is set to form an enlarged secondary head on the rivet.

These and other objects will become apparent from the accompanying description along with the drawings.

DESCRIPTION OF THE PREFERRED EMBODIMENT

Figure 1:
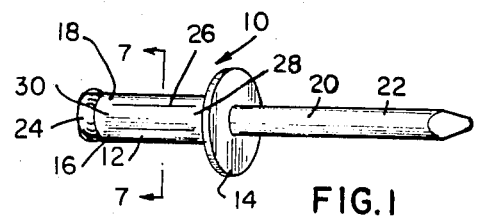
FIG. 1 is an illustration of the blind rivet assembled on a mandrel.

Attention is now directed to FIG. 1 which illustrates the rivet 10 having a cylindrical open body 12 with a flange 14 disposed on one end normal to the longitudinal extent of the body 12. The rivet body 12 is open at 16 on the end 18 opposite the flange 14.

A mandrel 20 has a stem 22 adapted to pass through the rivet body 12 and head 24 adapted to seat against the end 18 of the rivet body 12. There is a shoulder (not shown) adjacent the mandrel head that has an interference fit into the opening 16 to retain the mandrel and rivet in assembled condition, as is well known in the art. The rivet body is adapted to be inserted through the opening in a workpiece and by holding the flange against the workpiece and pulling on the mandrel stem, the mandrel head is forced against the open end of the rivet body to upset the rivet body to form a secondary head on the rivet. This is a well known procedure in the art of setting blind rivets.

In the conventional rivet, the rivet is supplied in many diameters and lengths so that the rivet body is sized to the opening in the workpiece and the thickness of the workpiece. That is, in the conventional rivet, a rivet size and length is selected so that the rivet body is slightly smaller than the size of the opening in the workpiece and the rivet length is slightly longer than the thickness of the work piece, so that, upon forming the rivet, the rivet body has a tight fit in the opening in the workpiece and the secondary head is forced against the surface of the workpiece in a small area.

The rivet of this invention overcomes the necessity of having a plurality of different sized rivets and is able to not only be utilized in a workpiece material that is soft, but will also secure workpieces together that have a wide range of thickness.

As illustrated in FIG. 1, the rivet body 12 has a plurality of elongated weakened areas 26 extending longitudinally of the body 12 and spaced at 28 and 30 from the flange 14 and end 18 of the rivet body. The weakened areas 26 are substantially through the material thickness of the body itself to localize the area in which the rivet body will deform during the forming of the rivet. The weakened areas 26 also are formed in the rivet body without changing the circular crossectional contour of the rivet body. Further, with the weakened areas terminating spaced from the flange and end of the rivet body, the flange will not tear loose from the rivet body and the mandrel head will bury into the rivet body and be held thereby after the rivet is set, as will become more apparent hereinafter. Further, the forces normal to the rivet body are less so that the rivet can be utilized with softer material without effecting the shape of the opening in the workpiece. Additionally, since there is less force normal to the rivet body, it is not necessary that the rivet body fit snugly in the opening in the workpiece, as is the case of the conventional rivet, to enable the rivet secondary head to be formed. Therefore, the rivet can be used in oversized holes, that is, holes larger in diameter than the diameter of the rivet body (see FIG. 2).

Figure 2:
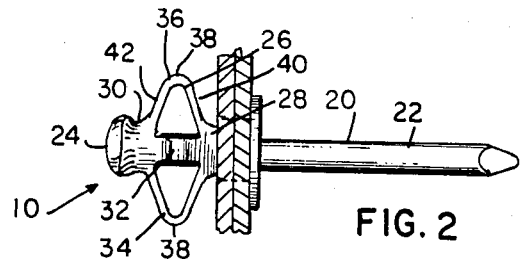
FIG. 2 is an illustration of the blind rivet in a workpiece and illustrating the forming of the rivet body at the beginning of setting operation.

As illustrated in FIG. 2, as the mandrel 20 is pulled (while the flange 14 is being held in the conventional manner by the nosepiece of a tool, not shown), the rivet body 12 separates along the lines of the weakened areas 26 to form a plurality of wings or petals 32, 34, 36. The weakened areas 26 are circumferentially equally spaced about the rivet body 12 so that the axial pulling force of the mandrel head 24 will remain axial, and force each of the petals 32 to 36 out equally from the rivet body 12. Further, each of the petals 32 to 36 will deform at their medial area 38 so that the upper and lower deformed portions 40 and 42 will be equal in length.

As the mandrel is further pulled, the secondary head is formed. Because of the length of the rivet body in comparison to the thickness of the workpieces 44 and 46, the deformed portions 40,42 will extend outwardly beyond the opening 48 in the workpieces even though the opening 48 is larger than the diameter of the rivet body (See FIGS. 2 and 3). Since the deformed portion 42 overlaps the deformed portion 40, additional rigidity is obtained in the contact of portion 40 with the workpiece. Further, since the weakened areas are circumferentially equally spaced about the rivet body, the axial force of the mandrel head will equally deform the petals 32 to 36. This arrangement enables the rivet of this invention to be used in soft materials without affecting the opening in the workpiece.

Figure 3:
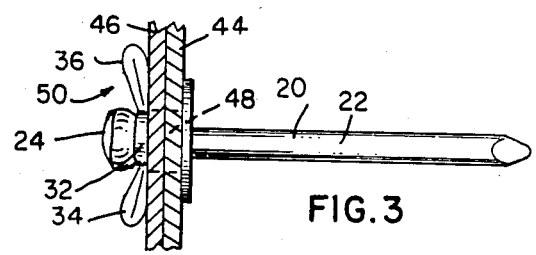
FIG. 3 is an illustration of the rivet at the completion of the setting operation.

Attention is now directed to FIG. 3 which illustrates the rivet with the secondary head 50 completely formed. As in a conventional rivet, as the secondary head becomes completely formed, the mandrel stem 22 will break from the head 24 leaving the head formed into the end 18 of the rivet body as illustrated in FIG. 3. With the rivet body having a uniform crossection throughout its length and the head 24 becoming surrounded by the deformed open end 16, the head 24 becomes partially encapsolated by the rivet body to retain the head 24 in the rivet.

Figure 7:
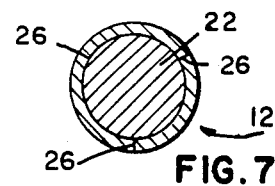
FIG. 7 is an enlarged sectional view taken along the line 7—7 of FIG. 1.

It should also be noted that the weakened areas leave the solid portions of the rivet body that form petals 32-36 in abutting relation when the rivet is in the free state. This lends structural integrity to the rivet body for handling and insertion of the mandrel during the assembly of the rivet and mandrel. Further, the petals 32-36 that form the secondary head have a maximum crossectional dimension giving maximium surface area contact of the secondary head to the workpiece (see FIG. 7).

Figure 6:
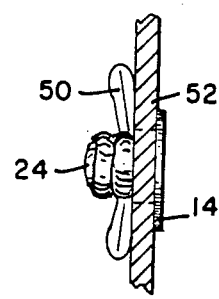
FIG. 6 an illustration of the rivet positioned through a thin workpiece.

Another novel feature of the large secondary head rivet of this invention is that the rivet is capable of fastening a wide range of thicknesses of workpieces together. As illustrated in FIG. 6, the rivet can be secured to a thin workpiece 52 in the same manner as described in connection with securing the workpieces 40 and 42. Because of the weakened areas 26 and their equal longitudinal spacing about the rivet body, the petals 32-36 will be equally formed against the workpiece as previously described.

Figure 5:
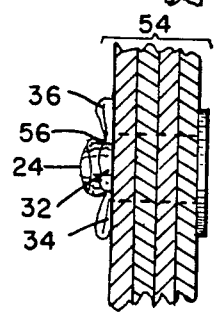
FIG. 5 is an illustration of the rivet positioned through a considerable thickness of material.

FIG. 5 illustrates a substantially thicker group 54 of workpieces being secured together by the novel rivet of this invention. The thickness of workpieces which can be secured together is the depth from the flange to a location longitudinally spaced from the ends of weakened areas 26 adjacent the end 18 of the rivet body 12. As illustrated in FIG. 5, the head 24 of the mandrel will deform the end 18 of the rivet body and the weakened area 56 is exposed beyond the workpiece. In this fashion, the rivet can secure together workpieces of greater thickness lending additional flexibility to the adoptations to which the rivet can be put to use.

Figure 4:
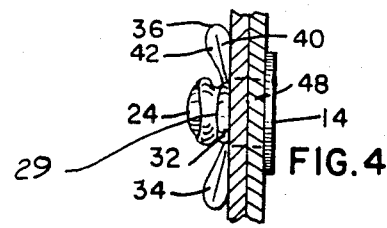
FIG. 4 is an illustration of the set rivet with the mandrel removed.

It should also be noted that in the application illustrated in FIGS. 4 and 6, the mandrel head 24 is retained in the solid body portion of the rivet body 12 at rivet end 18 and that the solid area 30 of the rivet body 12 abuts at 29 (see FIG. 4) the solid area 28 of the rivet body 12 to seal the rivet body 12 in the workpiece opening. Thus, the opposed sides of the workpieces are moisture and air sealed from one another. Therefore, in the application, workpiece 44 could be secured to the blind side of the workpiece 46 wherein it is desirable that moisture and air not be permitted in the area of the backside of workpiece 46.

It can thus be seen that with a blind rivet having a rivet body with longitudinally equally spaced weakened areas on the rivet body, a larger bearing area of the secondary head can be obtained. Further, the rivet is particularly adaptable for use in soft workpieces and where oversized openings are present in the workpieces. Additionally, the novel rivet of this invention is capable of fastening a wide range of thicknesses of material.

We claim:

1. A blind rivet of the type adapted to be inserted into the opening in a workpiece and having a flange at one end and adapted to be deformed by the head of a mandrel at the opposite end when the mandrel is pulled:
   a. an elongated rivet body carrying a flange on one end and being open at the opposite end;
   b. said rivet body having a plurality of longitudinally extending weakened areas between the flange and the open end;
   c. said weakened areas extend through said rivet body to form slots therein and are circumferentially equally spaced about the rivet body and each said weakened areas terminate substantially spaced from said flange and said open end so there are continuous solid areas of the rivet body adjacent said flange and said open end;
   d. said rivet body having longitudinally extending solid portions between said weakened areas that have abutting line contact throughout their longitudinal extent at said weakened areas;

e. said weakened areas being adapted to separate when the rivet body is deformed to form from said solid portions a plurality of outwardly extending petals that form an enlarged secondary head on the rivet;

f. said weakened areas only of said rivet body being adapted to be deformed when the mandrel is pulled so that minimal lateral forces would be exerted on an opening in a workpiece and the deformation of said rivet body would be localized;

g. when the rivet is deformed, the solid area of said open end being adapted to retain the mandrel head and being received against the solid area adjacent said flange, and closer to said flange than the termination of said weakened area to seal the rivet within the workpiece opening.

2. The blind rivet of claim 1 wherein said outwardly extending petals equally extend circumferentially outward from the rivet body to form a secondary head.

3. The blind rivet of claim 2 wherein said petals are formed from said solid portions of the rivet body folded upon themselves which lends strength to the secondary head.

* * * * *